(12) United States Patent
Schulz et al.

(10) Patent No.: US 11,351,964 B1
(45) Date of Patent: *Jun. 7, 2022

(54) SECURITY DEVICE USING SEQUENCES OF FINGERPRINTS

(71) Applicant: UIPCO, LLC, San Antonio, TX (US)

(72) Inventors: Deborah Janette Schulz, San Antonio, TX (US); Gregory Brian Meyer, San Antonio, TX (US); Sean Carl Mitchem, San Antonio, TX (US); Ruthie D. Lyle, Durham, NC (US); Will Kerns Maney, Jr., San Antonio, TX (US); Bryan J. Osterkamp, New Braunfels, TX (US); Timothy Blair Chalmers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,809

(22) Filed: Feb. 17, 2021

Related U.S. Application Data

(63) Continuation of application No. 16/577,192, filed on Sep. 20, 2019, now Pat. No. 10,967,837.

(60) Provisional application No. 62/783,461, filed on Dec. 21, 2018.

(51) Int. Cl.
| | |
|---|---|
| *B60R 25/25* | (2013.01) |
| *G06F 3/041* | (2006.01) |
| *G06K 9/00* | (2022.01) |
| *B60R 25/10* | (2013.01) |
| *G06V 40/13* | (2022.01) |

(52) U.S. Cl.
CPC ........ *B60R 25/252* (2013.01); *B60R 25/1001* (2013.01); *B60R 25/1003* (2013.01); *G06F 3/041* (2013.01); *G06V 40/13* (2022.01)

(58) Field of Classification Search
CPC .............. B60R 25/252; B60R 25/1001; B60R 25/1003; G06F 3/041; G06K 9/00013
See application file for complete search history.

(56) References Cited

U.S. PATENT DOCUMENTS

| | | | |
|---|---|---|---|
| 6,100,811 A * | 8/2000 | Hsu ..................... | B60R 25/2081 340/426.36 |
| 10,967,837 B1 * | 4/2021 | Schulz ................ | B60R 25/1001 |
| 2002/0138767 A1 * | 9/2002 | Hamid ................... | G07C 9/257 340/5.82 |
| 2016/0189158 A1 * | 6/2016 | Eramian ............ | G06Q 20/4014 705/44 |
| 2016/0217312 A1 * | 7/2016 | Gardiner .............. | G06Q 20/409 |
| 2017/0116453 A1 * | 4/2017 | Ganapathi .............. | G06V 40/12 |
| 2017/0372050 A1 * | 12/2017 | Liu .......................... | G06F 21/32 |

(Continued)

*Primary Examiner* — Thomas D Alunkal
(74) *Attorney, Agent, or Firm* — Plumsea Law Group, LLC

(57) ABSTRACT

A security device is disclosed. The security device includes multiple fingerprint sensors. Activating the security device requires users to enter an authentication sequence comprised of different finger-to-fingerprint-sensor combinations. This increases the number of available distinct elements that can be used in an authentication sequence of a given length for a fixed number of buttons. The device also combines two different modes of authentication to improve security. The security device can be integrated into motor vehicles, mobile computing devices or other systems.

20 Claims, 8 Drawing Sheets

(56) References Cited

U.S. PATENT DOCUMENTS

2018/0172145 A1* 6/2018 Farges ................... F16H 59/10
2018/0196988 A1* 7/2018 Tse ......................... G06F 21/32
2018/0321786 A1* 11/2018 Dangy Caye .......... G04G 21/08

* cited by examiner

SECURITY DEVICE USING SEQUENCES OF FINGERPRINTS

CROSS-REFERENCE TO RELATED APPLICATIONS

This application is a continuation of and claims benefit to U.S. patent application Ser. No. 16/577,192, filed on Sep. 20, 2019 and titled "Security Device Using Sequences of Fingerprints" which application claims the benefit of U.S. Provisional Patent Application Ser. No. 62/783,461 filed Dec. 21, 2018, and titled "Security Device Using Sequences of Fingerprints," which applications are incorporated by reference herein in their entirety.

TECHNICAL FIELD

The present disclosure generally relates to security devices, and in particular, to fingerprint based security devices.

BACKGROUND

Vehicles may include security components that authenticate authorized users and prevent unwanted users from unlocking and using the vehicles. The security components may include remote access devices, such as key fobs, that transmit an access code using Bluetooth or RFID technology. Some vehicles include physical keypads on the vehicle door handles, which can be used to enter a code and unlock the vehicle. The security of such systems is related to the number of available keys/buttons. Therefore, increasing the number of possible input sequences (and therefore, the overall security of the system) requires adding additional physical buttons.

There is a need in the art for a system and method that addresses the shortcomings discussed above.

SUMMARY

In one aspect, a vehicle security device integrated into a vehicle includes a set of fingerprint sensors with at least a first fingerprint sensor and a second fingerprint sensor. The second fingerprint sensor is disposed proximally to the first fingerprint sensor. The vehicle security device also includes a memory device storing an authentication sequence. The authentication sequence includes a sequence of fingerprint to fingerprint sensor combinations. The authentication sequence includes a first fingerprint to fingerprint sensor combination with information about a first fingerprint template and information about the first fingerprint sensor. The authentication sequence includes a second fingerprint to fingerprint sensor combination with information about a second fingerprint template and information about the second fingerprint sensor. The vehicle security device is activated when the authentication sequence is entered using the set of fingerprint sensors.

In another aspect, a security device includes a set of fingerprint sensors with at least a first fingerprint sensor and a second fingerprint sensor. The second fingerprint sensor is disposed proximally to the first fingerprint sensor. The security device also includes a memory device storing an authentication sequence, the authentication sequence further including a sequence of fingerprint to fingerprint sensor combinations. The authentication sequence includes a first fingerprint to fingerprint sensor combination with information about a first fingerprint template and information about the first fingerprint sensor. The authentication sequence includes a second fingerprint to fingerprint sensor combination with information about a second fingerprint template and information about the second fingerprint sensor. The security device is activated when the authentication sequence is entered using the set of fingerprint sensors.

In another aspect, a security device includes a fingerprint sensor and a memory device storing an authentication sequence. The authentication sequence further includes a sequence of fingerprint templates. The authentication sequence includes information about at least two different fingerprint templates. The security device is activated when the authentication sequence is entered using the fingerprint sensor.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a security device (or security system) that can be integrated into other devices, machines, or systems. The security device includes one or more buttons or contact areas with integrated fingerprint sensors. The security device also includes memory for storing a predetermined sequence of fingerprints or a predetermined sequence of fingerprint and fingerprint sensor combinations.

The security device can activated by entering the predetermined sequence of fingerprints (or fingerprint and fingerprint sensor combinations). When the security device is activated, the security device may act to change the state of the associated system. Such actions can include "unlocking", "locking", "starting", "stopping", "turning on", or "turning off" the associated system. In some cases, the security device sends information, in the form of a message, control command or other electronic signal, that induces a change in the state of the associated system. As an example, a security device could be used to unlock a vehicle. As another example, a security device could be used to turn off a vehicle alarm system.

In some embodiments, the security device may be integrated into a motor vehicle. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

Using the exemplary security device to unlock (or turn on and/or start) a vehicle may provide increased security by greatly increasing the number of elements that can be used to form an unlocking sequence. Specifically, using fingerprint sensors with each button on a security keypad increases the number of available elements by 10, since each fingerprint sensor can detect 10 different fingerprints per user.

Also, existing systems that use a single fingerprint sensor to detect a single fingerprint may be fooled by so called adversarial attacks that attempt to fool the pattern matching systems used by the fingerprint sensors. Using multiple fingerprint sensors and requiring users to enter a sequence of different fingerprints at different fingerprint sensors adds a second level of authentication since a would-be attacker must not only provide multiple fake fingerprints, but also determine the sequence in which these fake fingerprints are presented at the different fingerprint sensors. That is, the exemplary systems combine two well-known types of authentication: passcodes and biometric methods.

Figure 1:
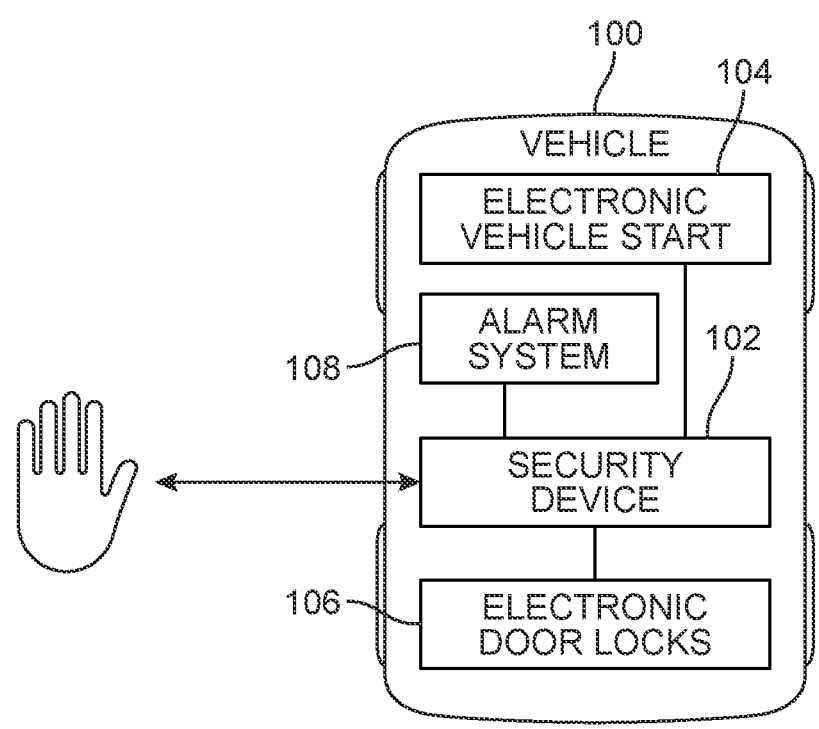
FIG. 1 is a schematic view of a vehicle with a security device, according to an embodiment.

FIG. 1 is a schematic view of a vehicle 100. Vehicle 100 may include a security device 102. Security device 102 may be connected to one or more other vehicle systems including, but not limited to: electronic vehicle start system 104, electronic door locks system 106 and alarm system 108. For example, security device 102 may send information (for example, messages/commands or control signals) to electronic vehicle start system 104 to turn on the vehicle and/or start the engine. Also, security device 102 may send information to electronic door locks system 106 to have one or more doors automatically unlocked. Also, security device 102 may send signals to alarm system 108 to disarm the alarm system. In some cases, information (such as commands or control signals) may be sent whenever a user enters the correct sequence of fingers, or the correct sequence of finger/sensor combinations.

Figure 2:
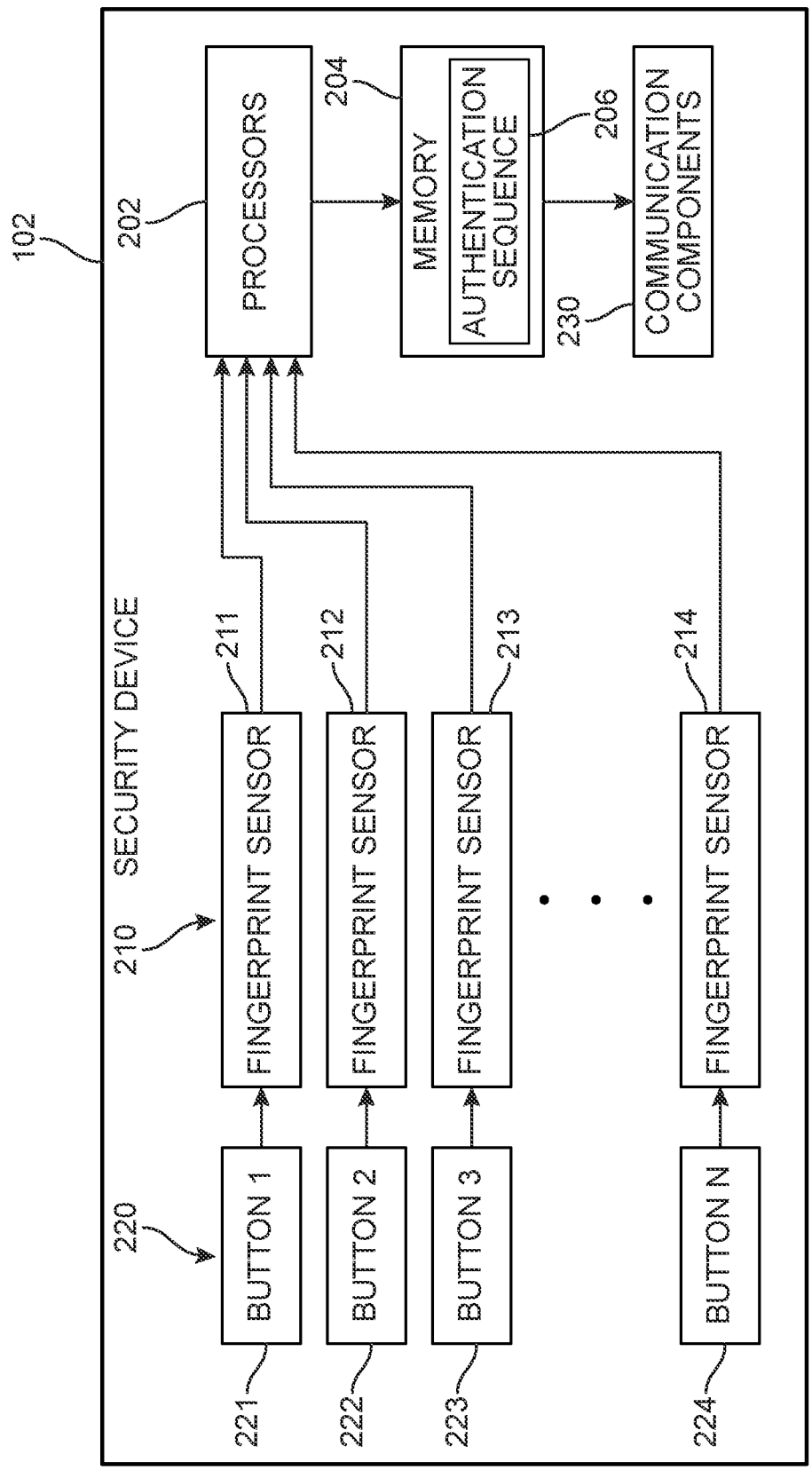
FIG. 2 is a schematic view of security device including a set of fingerprint sensors, according to an embodiment.

FIG. 2 is a schematic view of an exemplary security device 102. Security device 102 may be comprised of processors 202, memory 204 and a set of fingerprint sensors 210. Memory 204 may comprise a non-transitory computer readable medium. Instructions stored on the non-transitory computer readable medium may be executed by the one or more processors 202. Memory 204 may include any type of short-term and/or long-term memory (or storage), including Random Access Memory (RAM), micro-SD memory and Solid State Drives (SSD).

Set of fingerprint sensors 210 may comprise any suitable number of fingerprint sensors (also sometimes referred to as fingerprint readers). In the exemplary embodiment, set of fingerprint sensors 210 includes a first fingerprint sensor 211, a second fingerprint sensor 212, a third fingerprint sensor 213 and an Nth fingerprint sensor 214. In some embodiments, a single fingerprint sensor could be used, as discussed in further detail below. In other embodiments, two fingerprint sensors could be used. In still other embodiments, three fingerprint sensors could be used. In still other embodiments, four or more fingerprint sensors could be used.

Generally, a fingerprint sensor is any device used to capture a digital image of a fingerprint pattern and process the image to create a biometric template. In some cases, the biometric template comprises extracted features from the fingerprint image. That is, the biometric template could comprise information extracted from the image, but the complete image may not be stored. In other cases, the biometric template could include the (possibly processed) fingerprint image. Authentication occurs by matching a fingerprint in real time with a stored biometric template (also referred to as a "fingerprint template").

The embodiments may use any kind of fingerprint sensors known in the art. These include, but are not limited to: optical sensors, capacitive sensors, RF sensors, thermal sensors, piezo-resistive sensors, ultrasonic sensors, piezoelectric sensors, and microelectromechanical systems (MEMS) based sensors.

A security device can include provisions for preprocessing fingerprint images captured by sensors. This may comprise filtering images to remove noise. Embodiments can also include provisions for matching stored biometric templates with sensed fingerprints. Any known pattern recognition and matching algorithms could be used, including any suitable machine learning algorithms. In some cases, algorithms may compare basic fingerprint patterns (such as the arch, whorl, and loop of a fingerprint) between a previously stored template and a recently scanned fingerprint.

Each fingerprint sensor can be associated with a button of security device 210. As used herein, the term "button" may generally refer to an outer contact surface where a finger is placed for sensing by an underlying fingerprint sensor. In some cases, a mechanical button that can be depressed may be used. In other cases, a virtual button associated with a touch based display may be used.

In the embodiment of FIG. 2, security device 102 includes a set of buttons 220. These buttons include first button 221, second button 222, third button 223 and Nth button 224, which correspond with first fingerprint sensor 211, second fingerprint sensor 212, third fingerprint sensor 213 and Nth fingerprint sensor 214, respectively. Moreover, as described above, the physical layout of security device 102 may be such that each fingerprint sensor is disposed under a corresponding button (which may simply be a contact area). It may be appreciated that in some embodiments, the button (or exterior contact area) may be integrated directly with the fingerprint sensor and may not be a distinct component.

The buttons on security device 102 may allow users to enter sequences of finger-button combinations. As used herein, the term "finger-button" combination refers to a combination of a particular finger (or fingerprint) with a particular button (or fingerprint sensor) on the security device. Because there is a direct correspondence between each finger and fingerprint, and between each button and an underlying fingerprint sensor, finger-button combinations may alternatively be referred to as "finger-sensor combinations", or "fingerprint to fingerprint sensor combinations". For convenience, the term "finger-button" is used throughout much of the detailed description.

The buttons and fingerprint sensors may be disposed proximate, or adjacent, one another. For example, in some embodiments, the buttons (and underlying sensors) could be arranged as a series of buttons forming a keypad. Such an example is described below and depicted in FIG. 5.

Figure 3:
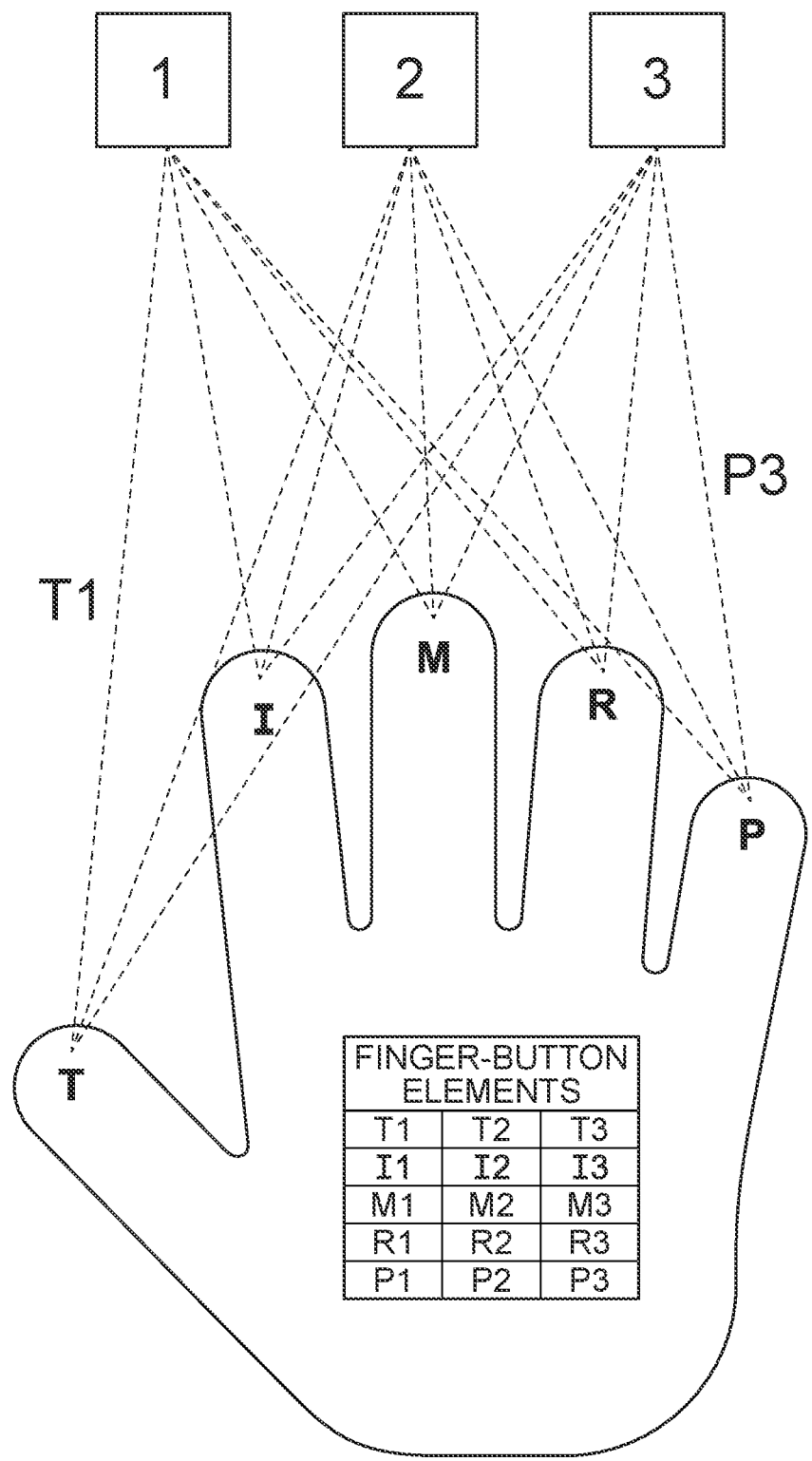
FIG. 3 is a schematic view of exemplary finger-button elements for a three button system, according to an embodiment.

FIG. 3 depicts a schematic view of different finger-button combinations. Here, each finger of a right hand is labeled according to the first letter of its colloquial name (T for "thumb", I for "index finger", M for "middle finger", R for "ring finger", and P for "pinky"). Likewise, there are three distinct buttons (with underlying fingerprint readers that are not shown), labeled as button 1, button 2 and button 3. Schematic lines pairing each finger with one of the three buttons correspond to the different "finger-button elements" listed in the table of FIG. 3. For example, a first finger-button element T1 (upper left corner of the table) corresponds to the combination of placing the thumb onto button 1 (and thus recording the thumbprint at the fingerprint sensor associated with button 1). Likewise, another finger-button element P3 (lower right corner of the table) corresponds to the combination of placing the pinky on button 3 (and thus recording the pinky fingerprint at the fingerprint sensor associated with button 3). As seen in the table of FIG. 3, there are fifteen different finger-button elements, as there are five fingers and three buttons (so 5*3=15 total combinations). If both hands are considered, there would be thirty different finger-button elements, corresponding to ten fingers and three buttons (so 10*3=30 total combinations).

A predetermined sequence of finger-button combinations that cause the security device to send information (such as an unlock command) to another device may be referred to as an "authentication sequence." The length of an authentication sequence is the number of finger-button combinations in the sequence. In different embodiments, the length of an authentication sequence may have any suitable value. In some embodiments, the authentication sequence could comprise between 1 and 10 finger-button combinations. In other embodiments, the authentication sequence could comprise 10 or more finger-button combinations.

Referring back to FIG. 2, memory 204 of security device 210 may be used to store an authentication sequence 206.

Security device 102 may comprise control logic. The control logic may be distributed among hardware (within processors 202) and software (within memory 206). The control logic may facilitate creating, storing, and/or erasing authentication sequences. The control logic may also facilitate sending information to other devices, such as unlock commands.

Security device 102 may also include one or more communication components 230. Communication components may include a variety of different technologies for sending information (such as messages, commands and/or control signals) to systems such as electronic vehicle start system 104, electronic door locks system 106 and alarm system 108. These include, but are not limited to: cellular network components, WiFi components, personal area network (PAN) components and RFID components. In some embodiments, security device 102 may be connected to other devices or systems using wired connections. Through one or more communication components, security device 102 could send commands to other devices/systems to unlock, disarm, open and/or startup the devices/systems.

Figure 4:
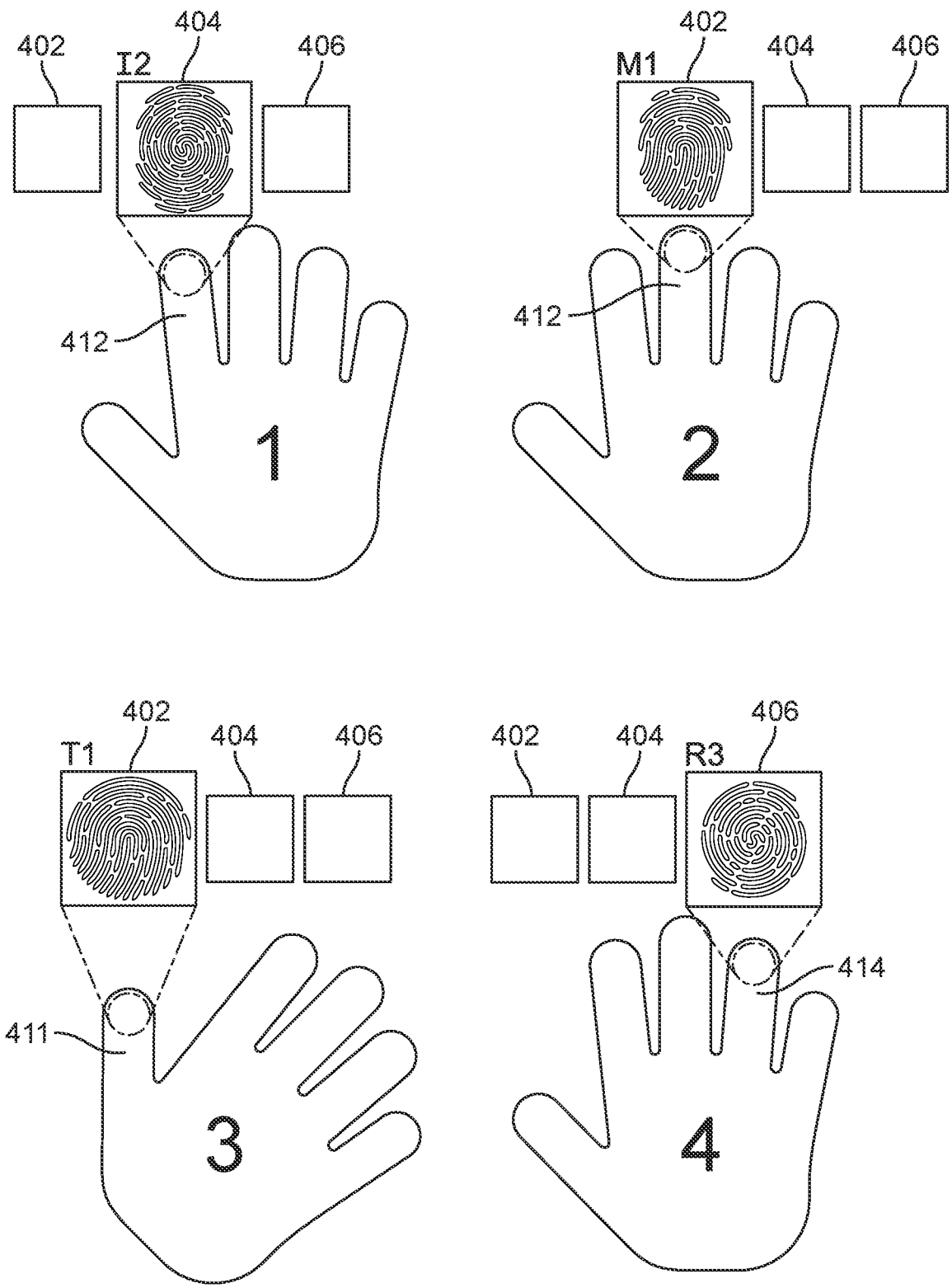
FIG. 4 is a schematic view of an exemplary authentication sequence using a security system with three buttons, according to an embodiment.

FIG. 4 is a schematic view of an exemplary authentication sequence comprised of four finger-button combinations. For clarity, each combination is labeled using the nomenclature of the table in FIG. 3. The authentication sequence requires the user to first place their index finger 412 on the second button 404 (finger-button element 12) so that the second fingerprint sensor detects the fingerprint from their index finger. Then, the user places their middle finger 413 on the first button 402 so that the first fingerprint sensor detects the fingerprint from their middle finger. Next, the user places their thumb 411 on the first button 402 so that the first fingerprint sensor detects their thumbprint. Finally, the user places their ring finger 414 on the third button 406 so that the third fingerprint sensor detects the fingerprint from their pinky finger. This corresponds to an authentication sequence (I2, M1, T1, R3).

In a security system that uses N buttons (without fingerprint sensors), the system would comprise authentication sequences comprised of only N elements. For an authentication sequence of length M, the number of possible distinct sequences would be $N^M$. By contrast, in the exemplary embodiments a system using N fingerprint sensors would comprise authentication sequences comprised of 10N=10 fingers×N fingerprint sensors. A sequence of length M would therefore have $(10N)^M$ possible distinct sequences, increasing the number of possible sequences by $10^M$ without adding any additional buttons to the system. This allows for improved security without increasing the area required to house buttons within a device (such as a car door handle or a touch-display). Moreover, it may be easier for users to recall finger-button combinations than simple button sequences. This is because the latter may invoke visually distinct elements (the different fingers touching different buttons) and it is known that the brain remembers images far better than it remembers sequences of numbers (button 1, button 2, etc.).

Figure 5:
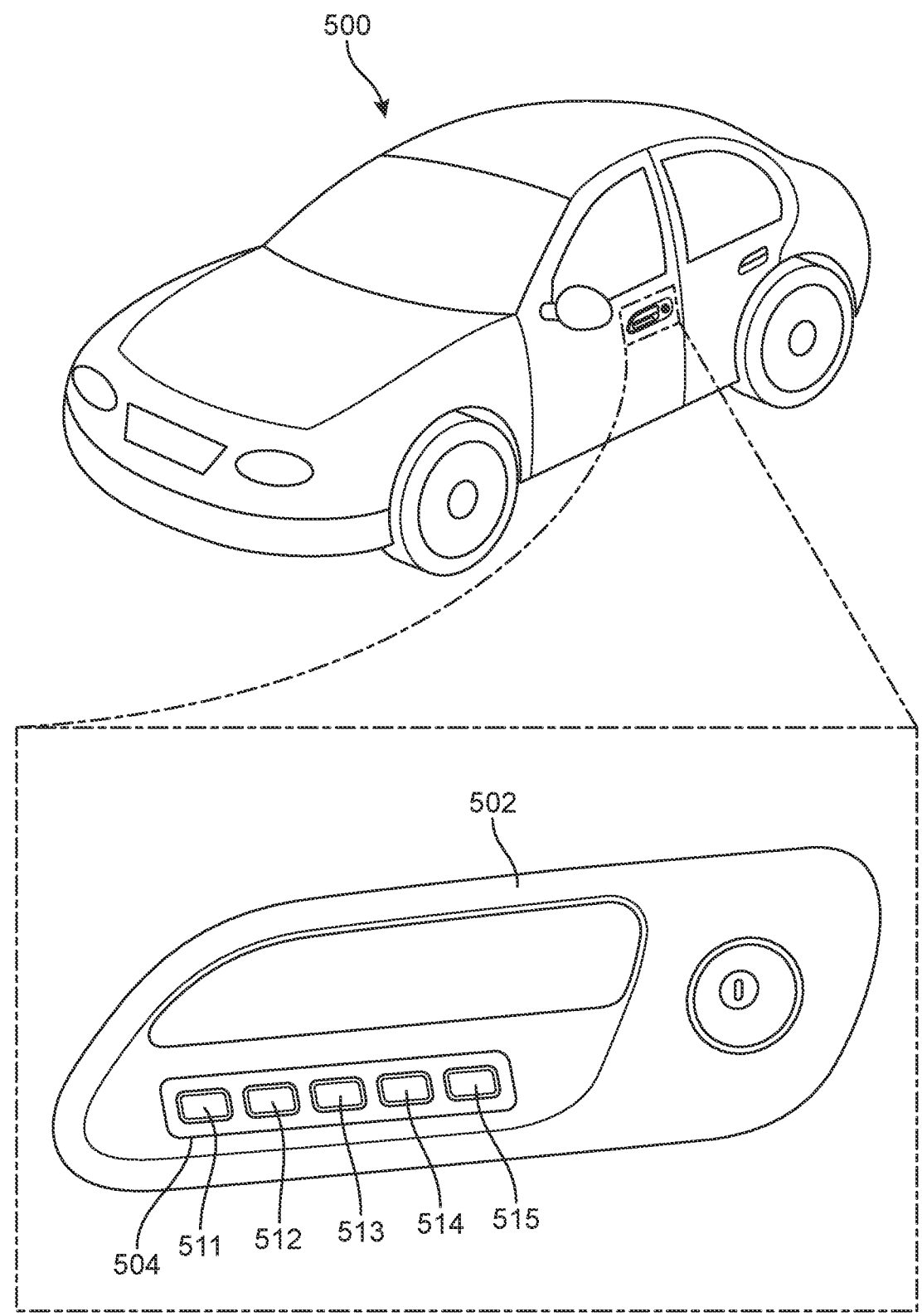
FIG. 5 is a schematic view of a vehicle with a keypad based security device disposed on an exterior of the vehicle, according to an embodiment.
Figure 6:
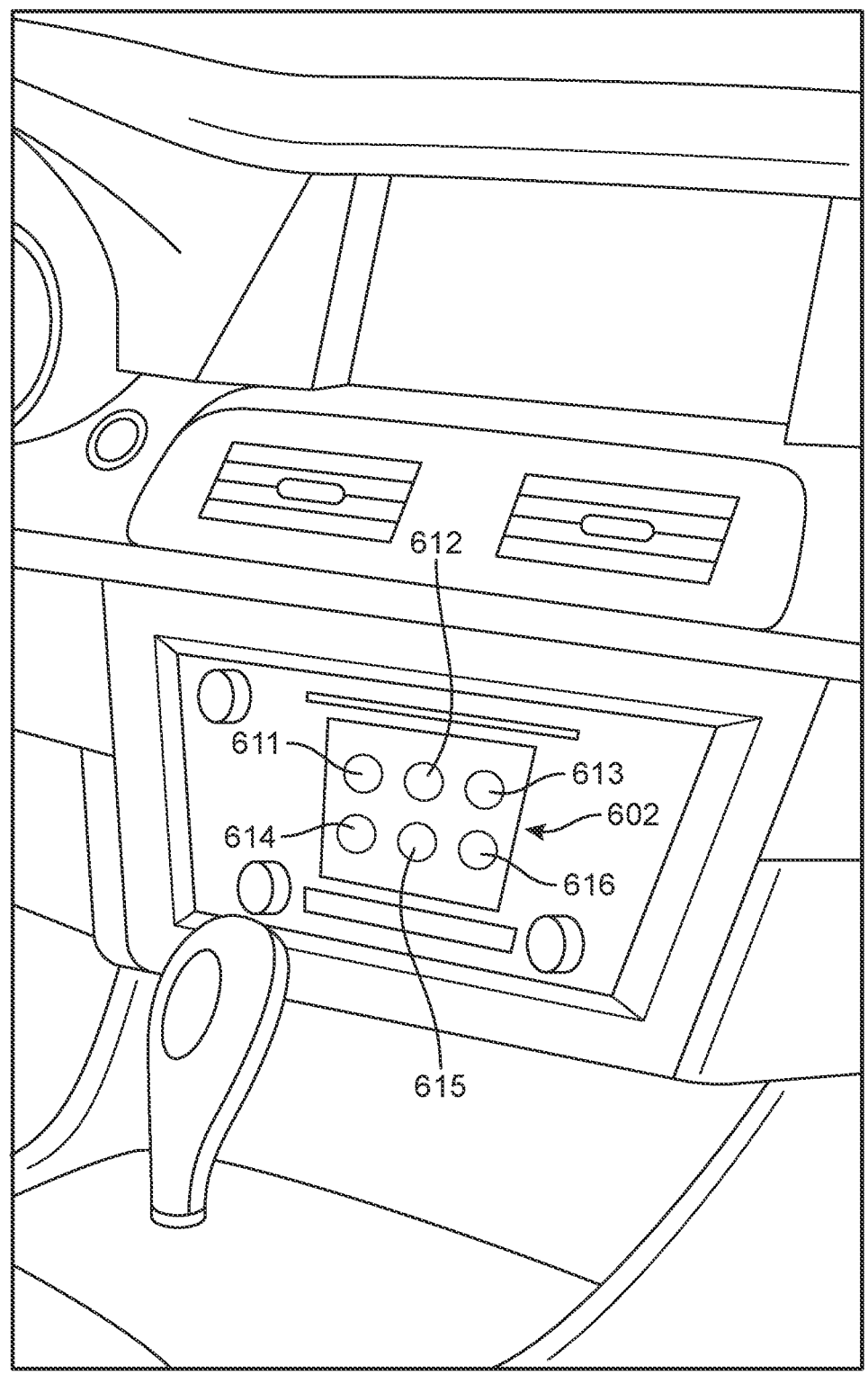
FIG. 6 is a schematic view of a touch-display based security system disposed inside a vehicle cabin, according to an embodiment.

FIGS. 5-6 depict schematic views of possible embodiments of a security device within a vehicle. Referring first to FIG. 5, vehicle 500 may include an electronic car locking system. In this embodiment, a security device may be integrated into door handle 502. Door handle 502 includes a keypad 504 with five buttons: first button 511, second button 512, third button 513, fourth button 514 and fifth button 515. Each of these buttons may be associated with a distinct fingerprint sensor. To unlock the vehicle, a user may enter an authentication sequence using these buttons.

In another embodiment depicted in FIG. 6, a security device may be integrated into a touch-display 602 within the interior of a vehicle. In this case, touch display 602 includes six virtual buttons: button 611, button 612, button 613, button 614, button 615 and button 616. Each button may be associated with a fingerprint sensor that is integrated within touch-display 602. To turn on, or start, this vehicle, a user may enter an authentication sequence using these buttons.

In other embodiments, a security device could include a single fingerprint sensor. Instead of detecting sequences of finger-button combinations, the security device could detect sequences of fingers (or fingerprints) at a single fingerprint sensor.

Figure 7:
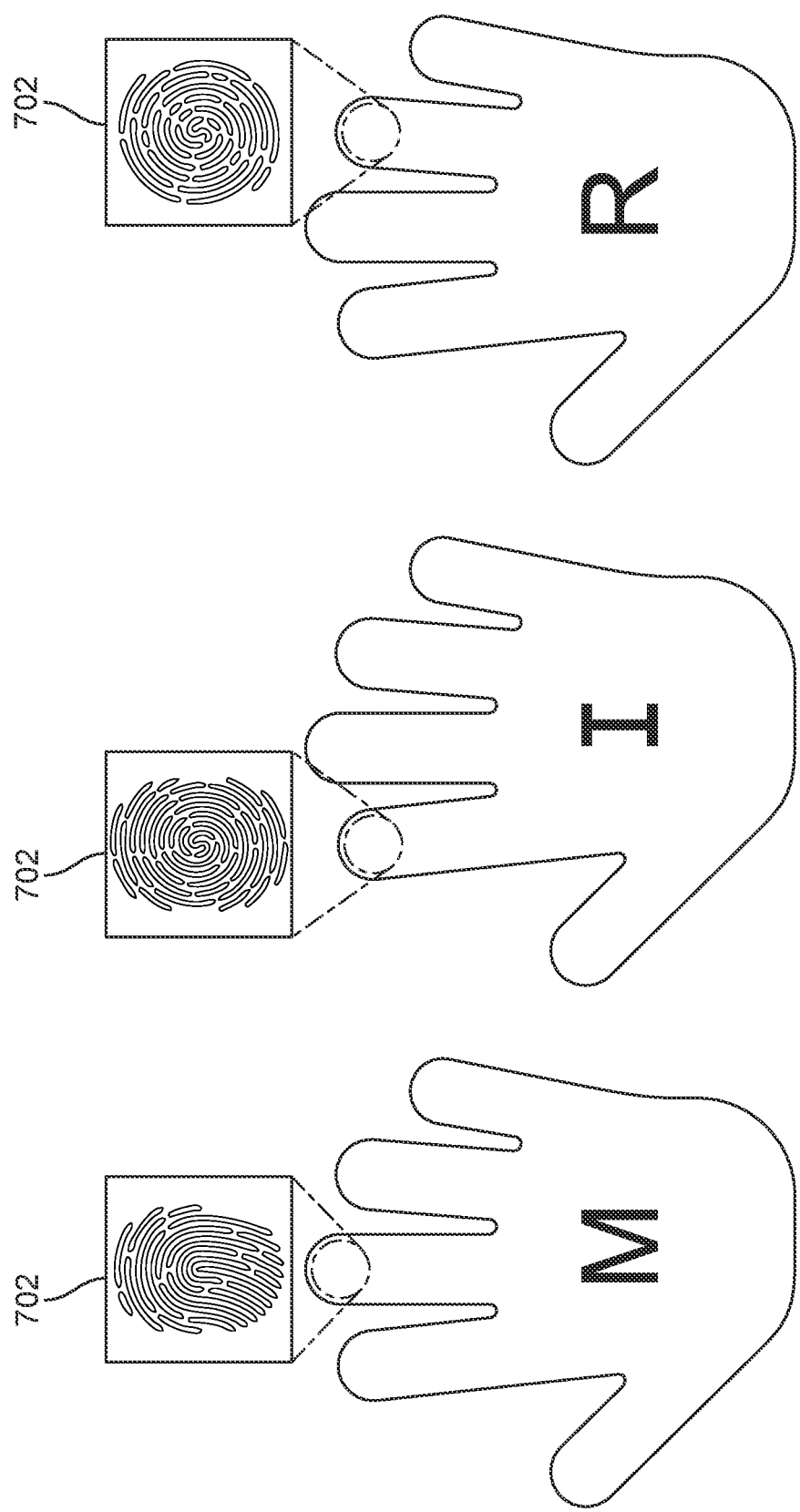
FIG. 7 is a schematic view of an exemplary authentication sequence using a security system with one button, according to an embodiment.

FIG. 7 is a schematic view of an authentication sequence used in a device with only a single button/fingerprint sensor. Referring to FIG. 7, a user may first place their middle finger (M) on the button 702. Next, the user may place their index finger (I) on the button 702. Finally, the user may place their ring finger (R) on the button 702.

Figure 8:
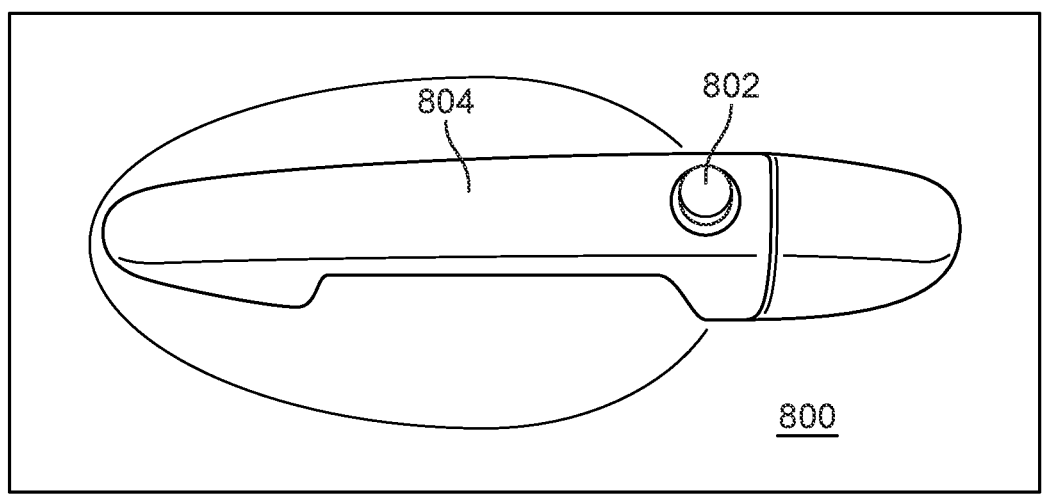
FIG. 8 is a schematic view of vehicle with a button based security device disposed on an exterior of the vehicle, according to an embodiment.

FIG. 8 is a schematic view of an embodiment of a security device with a single button/fingerprint sensor integrated into a vehicle 800. Specifically, a single button 802 is integrated into door handle 804. Such an embodiment may be useful where it is costly or otherwise undesirable to include multiple buttons on a part of a vehicle.

Figure 9:
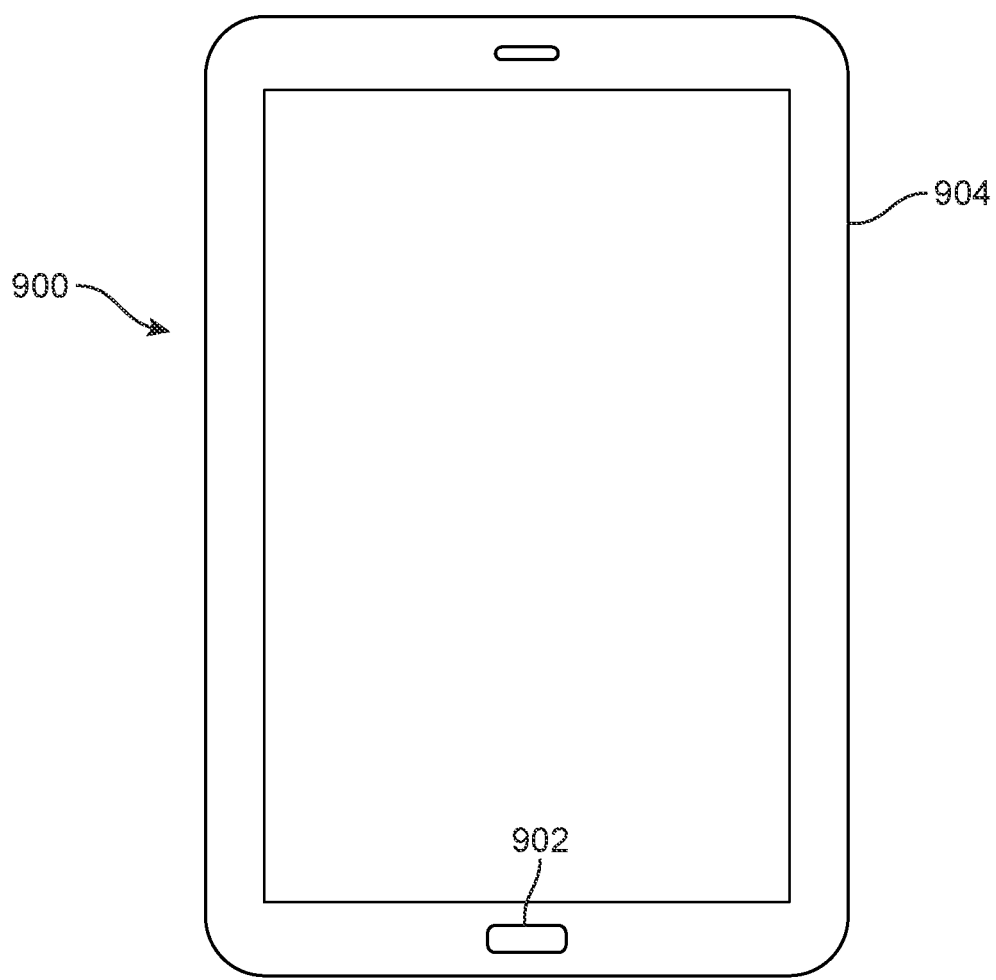
FIG. 9 is a schematic view of a mobile computing device with a button based security system.

FIG. 9 is a schematic view of an embodiment of a security device with a single button/fingerprint sensor integrated into a mobile computing device 900. For example, mobile computing device 900 may be a smartphone. Specifically, a single button 902 is integrated into device body 904. Such an embodiment may be useful where it is costly or otherwise undesirable to include multiple buttons on a part of a computing device. This may be useful in mobile computing devices like tablets and phones, since such devices are often already maxed out on places where additional hardware can be placed.

In other embodiments, a security device could be integrated into other electronic devices to perform security functions for those devices (such as unlocking the devices). Exemplary electronic devices include, but are not limited to: desktop computers, laptop computers, tablet computers, smartphones (or mobile phones), as well as other suitable kinds of electronic devices. In other embodiments, the security device could be integrated into one or more components of a smart home. For example, a security device could be integrated into an electronic door locking system that provides access to a home. Likewise, a security device could be integrated into an alarm system panel in a home so that deactivating an alarm requires not just a correct passcode, but also specific fingerprints at each button in the passcode sequence.

New authentication sequences could be setup using a special combination of buttons to initiate a setup mode. Alternatively, authentication sequences could be set using applications in computing devices that may pair with the security device (for example, using Bluetooth). In some cases, an application running on a mobile phone with its own fingerprint sensor could be used to generate fingerprint templates and to associate different fingerprint templates with different sensors in a specific order.

Although the embodiments depict the use of fingerprint sensors, other embodiments could include other kinds of biometric sensors. For example, in another embodiment, a security device could include multiple retina scanners associated with each "button". An authentication sequence may then correspond to scanning the retina at different buttons/scanners in a particular order. In some cases, different eyes could be used so that the authentication sequence corresponds to a sequence of eye/retina to button/retina scanner combinations. Other embodiments could include other kinds of biometric sensors such as voice recognition sensors.

In addition to using authentication sequences to enable unlock, open, and/or start/stop functionality in a vehicle or other device, authentication sequences could also be used for emergency situations. For example, if a user is threatened or coerced by another person at their vehicle and/or at the entrance to their home, the user could input an alternative authentication sequence that triggers a 911 call and/or silent alarm. This alternative authentication sequence may or may not also open the vehicle and/or home. Thus, some embodiments could include provisions for storing multiple different authentication sequences, where each authentication sequence provides different kinds of functionality from the associated device (for example, unlocking only vs. unlocking and triggering a silent alarm).

It may be appreciated that users could use fingers from their left hand, from their right hand, and/or from both hands, for the unique finger sequence. For example, in one embodiment, the sequence could include fingers from only a right hand. In another embodiment, the sequence could include fingers from only a left hand. In another embodiment, the sequence could include fingers from both hands. In still another embodiment, a user could program a system to treat corresponding fingers on the left and right hand as equivalent. That is, if the sequence is Thumb, Index Finger, Thumb, the system could allow a user to use either of their thumbs and either of their index fingers to enter in the sequence. This may be useful if a user is carrying things in one hand and cannot easily free up the left hand or right hand specifically. Or if the user has injured one finger, as discussed below.

Some embodiments may also include provisions for ensuring a user can unlock a device even if one of his or her fingers are injured. In some cases, a system could allow a user to store a "backup finger" to be used as an alternative to each finger. For example, a user could select to use fingers from his or her right hand for a security sequence, but may set the device to allow corresponding fingers from his or her left hand to be used as well. Thus, if the user has injured their right thumb, they can still enter a unique finger sequence by using their left thumb in place of their right thumb. In other embodiments, users could set an alternative sequence that can unlock a device using any finger (or any finger from a subset of fingers), but the alternative sequence may be substantially longer than the primary sequence using many different fingers to maintain a similar degree of security.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A security device, the device comprising:
a fingerprint sensor;
a memory device storing an authentication sequence, the authentication sequence further comprising a predetermined ordered sequence of fingerprint templates;
wherein the authentication sequence includes information about at least three different fingerprint templates in a predetermined order, the predetermined order comprising a first fingerprint template, a second fingerprint template, and a third fingerprint template;
wherein the security device is activated when the authentication sequence is entered in the predetermined order using the fingerprint sensor to match, in order, a first fingerprint to the first fingerprint template, a second fingerprint to the second fingerprint template, and a third fingerprint to the third fingerprint template; and
wherein each of the first fingerprint template, the second fingerprint template, and the third fingerprint template treat corresponding fingers on a left hand and a right hand of a user as equivalent.

2. The security device according to claim 1, wherein the security device can be used to unlock another device when the authentication sequence is entered using the fingerprint sensor.

3. The security device according to claim 1, wherein the security device comprises a physical button and wherein the button includes the fingerprint sensor.

4. The security device according to claim 1, wherein the security device comprises a touch based display, and wherein the fingerprint sensor is integrated into the touch based display.

5. The security device according to claim 1, wherein the security device is disposed in a mobile computing device.

6. The security device according to claim 5, wherein the security device is configured for use with a mobile phone.

7. The security device according to claim 1, wherein the security device is configured for use with a vehicle.

8. The security device according to claim 1, wherein the authentication sequence is a primary authentication sequence; and
the security device further comprising an alternative authentication sequence stored in the memory device;
wherein the alternative authentication sequence has a different predetermined order of fingerprint templates than the primary authentication sequence, the alternative authentication sequence configured for emergency situations such that entering the alternative authentication sequence triggers a call to police or a silent alarm.

9. A method of activating a security device by detecting an authentication sequence in a predetermined order, wherein the security device comprises a single fingerprint sensor and a memory device storing the authentication sequence, the authentication sequence further comprising a predetermined ordered sequence of fingerprint templates;
wherein the authentication sequence includes information about at least three different fingerprint templates in the predetermined order, the predetermined order comprising a first fingerprint template, a second fingerprint template, and a third fingerprint template;
the method comprising the following ordered steps:
detecting a first fingerprint by the single fingerprint sensor;
matching the first fingerprint to the first fingerprint template;
detecting a second fingerprint by the single fingerprint sensor;
matching the second fingerprint to the second fingerprint template;
detecting a third fingerprint by the single fingerprint sensor;
matching the third fingerprint to the third fingerprint template; and
activating the security device when the authentication sequence is entered in the predetermined order;

wherein each of the at least three different fingerprint templates are associated with a first hand of a user; and wherein at least one of the first fingerprint template, the second fingerprint template, and the third fingerprint template is associated with a backup fingerprint from a second hand of the user that corresponds to an equivalent finger on the first hand of the user.

10. The method according to claim 9, wherein the security device comprises a physical button and wherein the button includes the fingerprint sensor.

11. The method according to claim 9, wherein the security device comprises a touch based display, and wherein the fingerprint sensor is integrated into the touch based display.

12. The method according to claim 9, wherein the security device is disposed in a mobile computing device.

13. The method according to claim 9, wherein the security device is configured for use with a vehicle.

14. The method according to claim 13, wherein the security device is integrated into a door handle of the vehicle.

15. The method according to claim 9, wherein each of the at least three different fingerprint templates treat corresponding fingers on the first hand and the second hand of the user as equivalent.

16. The method according to claim 9, wherein the authentication sequence is a primary authentication sequence;

wherein the security device further comprises an alternative authentication sequence stored in the memory device; and wherein the alternative authentication sequence has a different predetermined order of fingerprint templates than the primary authentication sequence configured for emergency situations such that entering the alternative authentication sequence triggers a call to police or a silent alarm.

17. The method according to claim 9, wherein at least one of the at least three different fingerprint templates is from a different hand than the remaining fingerprint templates.

18. A security device, the device comprising:
a fingerprint sensor;
a memory device storing an authentication sequence, the authentication sequence further comprising a predetermined ordered sequence of fingerprint templates;

wherein the authentication sequence includes information about at least three different fingerprint templates in a predetermined order, the predetermined order comprising a first fingerprint template, a second fingerprint template, and a third fingerprint template, wherein each of the first fingerprint template, the second fingerprint template, and the third fingerprint template is from a first hand of a user;

wherein the security device is activated when the authentication sequence is entered in the predetermined order using the fingerprint sensor to match, in order, a first fingerprint to the first fingerprint template, a second fingerprint to the second fingerprint template, and a third fingerprint to the third fingerprint template;

wherein at least one of the first fingerprint template, the second fingerprint template, and the third fingerprint template is associated with a backup fingerprint from a second hand of the user that corresponds to an equivalent finger on the first hand of the user; and wherein the backup fingerprint replaces the at least one of the first fingerprint template, the second fingerprint template, and the third fingerprint template in the authentication sequence.

19. The security device according to claim 18, wherein the authentication sequence comprises a primary sequence having a predetermined number of the at least three different fingerprint templates in the predetermined order; and further comprising an alternative sequence having a number of the at least three different fingerprint templates that is greater than the predetermined number of the primary sequence.

20. The security device according to claim 19, wherein the primary sequence is associated with fingers of the first hand of the user; and wherein the alternative sequence is associated with fingers of both the first hand and the second hand of the user.

* * * * *